H. Y. NORWOOD.
METHOD OF JOINING METAL AND GLASS TUBES.
APPLICATION FILED NOV. 20, 1916.
1,232,074.
Patented July 3, 1917.
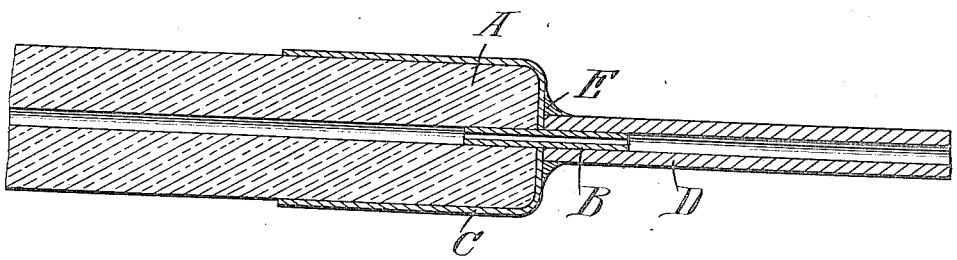
WITNESSES:
INVENTOR
Harry Y. Norwood
BY
his ATTORNEYS

UNITED STATES PATENT OFFICE.

HARRY Y. NORWOOD, OF ROCHESTER, NEW YORK, ASSIGNOR TO TAYLOR INSTRUMENT COMPANIES, OF ROCHESTER, NEW YORK, A CORPORATION OF NEW YORK.

METHOD OF JOINING METAL AND GLASS TUBES.

1,232,074. Specification of Letters Patent. Patented July 3, 1917.

Application filed November 20, 1916. Serial No. 132,391.

*To all whom it may concern:*

Be it known that I, HARRY Y. NORWOOD, of Rochester, in the county of Monroe and State of New York, have invented certain new and useful Improvements in Methods of Joining Metal and Glass Tubes; and I do hereby declare the following to be a full, clear, and exact description of the same, reference being had to the accompanying drawings, forming a part of this specification, and to the reference-numerals marked thereon.

The invention has to do with the art of joining metal and glass, and more particularly forming a joint between tubes of metal and tubes of glass, and it has for its purpose to form a rigid and air tight union. A further purpose of the invention resides in effecting an absolute seal between a glass and a metal tube, and at the same time imparting to the joint the necessary degree of strength and rigidity, whereby it will withstand as great a strain as the glass itself. Still an additional object of the invention is to construct a joint of this character in a sufficiently economical manner to make it practicable for manufacturing purposes in the different fields of use where it may find adoption. To these and other ends the invention consists in certain improvements and combinations of parts, all as will be hereinafter more fully described, the novel features being pointed out in the claims at the end of the specification.

The drawing is a sectional view of a joint constructed in accordance with one embodiment of the invention.

The invention is susceptible of a variety of applications and embodiments, and for purpose of illustration I will illustrate and describe a practical instance of its use, although it is to be understood that it is not limited in scope to the particular structure disclosed. In the manufacture of distance reading thermometers, it is sometimes necessary to extend a capillary tube, containing the indicating fluid, for a considerable distance, and it is therefore impracticable to form the entire length of the capillary tube of glass, although the latter material is desirably used for the indicating portion to which the heat expansive fluid is conducted and within which it moves in accordance with temperature changes. The combining of a metal and glass tube in a thermometer of the type suggested has resulted in the problem of making an effective joint between a glass tube and a metal tube, so that the heat expansive fluid can be conducted from the metal to the glass portion, while the metal part of the tube may be bent or extended to meet the requirements of its location.

With this end in view I employ a glass tube A and insert within the end thereof a secondary tube B, preferably of platinum, by reason of its having the same coefficient of expansion as glass. The secondary tube is arranged with one end extending beyond the end of the glass tube, and the two are then fused together to seal them tightly. I next form a cap C over the end of the glass tube A and around the body of the secondary tube B with which it contacts. The cap C is preferably constructed by electro-depositing copper onto the glass, according to any of the known methods for doing this. The cap C forms a brace for the secondary tube B, and also affords a means of attachment for the metal tube to which the glass tube is to be united. The metal tube is designated by D, formed of copper or other desirable material, and is secured over the secondary tube B, in engagement with the cap C, to which it is attached. The union between the cap C and the tube D is preferably accomplished by soldering the parts together, as indicated by E, the solder serving to maintain the tube D in tight engagement with the cap C and with the secondary tube B, and also affording a liquid and air tight seal.

It will be seen from this construction that the secondary tube B is sealed to the glass tube A by fusing, and that it is sealed to the metal tube D by the solder E, which provides a rigid connection between the metal tube D and the secondary tube B. Thus the joint between tubes A and B is absolutely fluid tight, and rigid enough to withstand any ordinary strains or rough usage to the same extent as the glass.

I claim as my invention:

1. The method of joining a metal tube to a glass tube consisting of inserting a secondary tube of platinum partially within the glass tube and fusing the glass and platinum, securing a cap over the end of the glass tube and around the body of the platinum tube, placing the metal tube over the projecting part of the platinum tube, and securing the metal tube to said cap.

2. The method of joining a metal tube to a glass tube, consisting of inserting a secondary tube of platinum partially within the glass tube and fusing the glass and platinum, forming a cap by electrolytic deposit over the end of the glass tube and around the body of the platinum tube, placing the metal tube over the projecting part of the platinum tube, and soldering the metal tube against said cap.

3. The method of joining a metal tube to a glass tube, consisting of inserting a secondary tube partially within a glass tube and fusing them together, securing a cap over the end of the glass tube and around the body of the secondary tube, placing the metal tube over the projecting end of the secondary tube, and securing the metal tube to said cap.

4. The combination with a glass tube, of a secondary tube arranged within the glass tube and projecting beyond the end thereof, a cap secured over the end of the glass tube and surrounding the body of the secondary tube, and a metal tube located around the opposite end of the secondary tube.

5. The combination with a glass tube, of a secondary tube fused within the glass tube and projecting beyond the end thereof, a cap formed over the end of the glass tube and surrounding the body of the secondary tube, and a metal tube located around the opposite end of the secondary tube and soldered to said cap.

6. The combination with a glass tube, of a secondary tube of platinum fused within the glass tube and projecting beyond the end thereof, and a metal tube secured over the opposite end of the secondary tube and sealed with respect to the glass and secondary tubes.

7. The combination with a glass tube, of a secondary tube of platinum fused within the glass tube and projecting beyond the end thereof, a cap formed over the end of the glass tube by electro-depositing and surrounding the body of the secondary tube, and a metal tube located around the opposite end of the secondary tube and soldered against said cap.

HARRY Y. NORWOOD.

Witnesses:
T. M. STEWART,
L. B. SWIFT.